Nov. 19, 1957 G. C. UCHRIN ET AL 2,813,976
TRANSISTOR OSCILLATOR
Filed Dec. 21, 1955
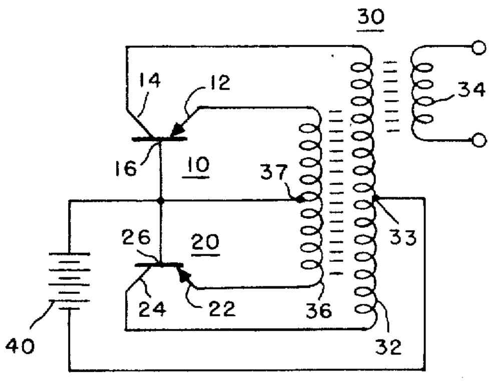
INVENTOR.
GEORGE C. UCHRIN
BY WILFRED O. TAYLOR
ATTORNEY 2,813,976

TRANSISTOR OSCILLATOR

George C. Uchrin, Eatontown, N. J., and William O. Taylor, Anderson, Mo., assignors to the United States of America as represented by the Secretary of the Army Application December 21, 1955, Serial No. 554,597

3 Claims. (Cl. 250—36)

(Granted under Title 35, U. S. Code (1952), sec. 266)

The invention described herein may be manufactured and used by or for the Government for governmental purposes, without the payment of any royalty thereon.

The subject invention relates to oscillators and particularly to oscillators producing square waves.

More particularly, this invention relates to a push-pull transistor oscillator for generating square waves.

The prior art teaches many types of oscillators actuated by vacuum tubes and, more recently, by transistors. Some of these oscillators are connected in push-pull. Most of these oscillators include capacitive coupling of the opposite sides of the push-pull circuit to produce a switch action in the tube or transistor. When this switching action is as fast as the tube or transistor will allow, a substantially square wave is produced.

Blocking oscillators are very well known in vacuum tubes where a transformer with a plate circuit winding and a grid circuit winding inductively couples the output of the tube to its control electrode in the form of positive feed back. This drives the tube alternately to cut off and to saturation, thereby producing square waves. Similar circuits have been tried with a transistor but they appear to produce square waves of uncertain characteristics.

In this invention two transistors are coupled to a transformer in push-pull. The transformer has a center tapped primary winding across the outputs of the transistors and a center tapped tertiary winding connected across the inputs of the transistors to produce positive feed back voltage. A conventional output winding is also provided. The transformer must be designed to be saturable within the rated current of the collector of either transistor.

It is therefore an object of this invention to provide an oscillator.

It is a further object of this invention to provide an oscillator producing square waves.

It is a further object of this invention to provide an oscillator requiring only a single transformer, a power supply, and two transistors.

It is a further object of this invention to provide a square wave oscillator that is frequency stable over a wide range.

It is a further object of this invention to provide an inductively coupled square wave oscillator having a lower frequency than that indicated by the LC constants of the circuit.

It is a further object of this invention to provide a transistor oscillator having a very high efficiency.

Other and further objects of this invention will become apparent from the following specification and the drawing which illustrates the basic circuit as taught by the invention.

In the drawing transistors 10 and 20 are coupled to the transformer 30 and source of potential 40. Transistor 10 has emitter electrode 12, collector electrode 14, and base electrode 16. Transistor 20 has emitter electrode 22, collector electrode 24, and base electrode 26.

The transformer has a primary winding 32 center tapped at 33, a secondary output winding 34, and a tertiary winding 36 having center tap 37. The base electrodes 16 and 26 are connected together, to the center tap 37 of the tertiary winding, and to the positive terminal of the source of potential 40. The collector electrodes 14 and 24 are connected to the opposing terminals of the primary winding 32. The emitters 12 and 22 are connected to the opposing terminals of the tertiary winding 36. The center tap 33 of the primary winding 32 is connected to the negative terminal of the source of potential 40.

In operation the source of potential 40 when initially connected across the circuit, will cause conduction through the transistors 10 and 20 and their associated circuitry. Since an absolute symmetry of the elements in these circuits would be almost physically impossible, one of the transistors conducts more than the other and consequently energizes its half of the primary winding to inductively feed back a voltage through the tertiary winding 36 to its control emitter. This further increases the current through this transistor to further increase the voltage on its emitter which effectively short circuits the collector and base electrodes of this transistor instantaneously.

Simultaneously the voltage applied by the tertiary winding to the control emitter of the opposite transistor drives it to cut-off. The firing of the first transistor produces a leading edge of a square wave of voltage across the output winding 34. The current through the shorted transistor builds up as fast as the impedance of its circuit constants will allow. This rate of current increase is primarily determined by the inductance and resistance of the transformer 30. The constant rate of increase in flux in the transformer core associated with the increase in current in this first half of the primary winding induces a constant voltage to form the top of the square wave across the secondary output coil 34.

As soon as the saturation point of the transformer core is reached there can be no further constant rate of increase in flux and all voltages in the transformer return to zero. This drop in voltage has a corresponding decay in flux which acts as stored energy to induce voltages of the opposite polarity in the transformer windings. This reversal of voltage removes the cut-off bias from the emitter of the other transistor and drives it to the conducting region of the other transistor. This starts the collector current flowing through the second half of the primary winding which induces a positive feed back across the second half of the tertiary winding to further actuate the emitter of the other transistor. This cumulative process short circuits the second transistor and cuts off the first transistor in the same way that the first transistor cut off the second at the beginning of the cycle, so that the current steadily builds up through the second transistor half of the transformer. This induces the opposite polarity of the square wave cycle across the output and when the transformer reaches saturation due to the current flowing in the reverse direction the voltages again drop to zero and the first transistor starts to conduct and the cycle starts to repeat itself.

The oscillator is self starting when the load is only about ⅕ of its optimum rated value or lower, but when rated load is applied across the output some type of starting device is necessary to start oscillation. Starting may also be achieved by unbalancing the circuit with an asymmetrical winding in the primary or tertiary coil of the transformer or by inserting an unbalancing element such as a resistance in series with any of the elements in either side of the push-pull circuit. More than one resistance can be used as long as the initial or starting effects do not cancel. A single resistor of about 100 ohms placed in the base circuit of one of the transistors would be a typical example of a starting circuit.

The frequency of this oscillator is primarily dependent on the supply voltage, the number of primary winding turns of the transformer, and the magnetic characteristics of the core material of the transformer. The frequency of the oscillator is given by the formula $$f=\frac{V}{4NB_{max}A_c10^{-8}}$$

where $f$=frequency in cycles per second
$V$=supply voltage in volts
$N$=number of turns in one side of the primary winding of the transformer
$B_{max}$=transformer core saturation flux density in lines per square inch
$A_c$=core area in square inches The transformer windings and core materials are normally chosen for a particular frequency with a certain voltage in mind. Once the circuit is completed the frequency can still be controlled to a certain extent by varying the voltage or the transformer characteristics. The transformer characteristics may be varied by changing the ratio of the windings, which would be equivalent to redesigning the transformer, or by applying a load across the transformer which would reflect a different impedance back into the transformer.

A load can obviously be applied across the output winding and this may be the actual load of the square wave oscillator. The change in frequency between no load and the optimum load, might be in the order of 10%. In view of this the normal load of the oscillator must be established before the oscillator frequency is determined.

The control of the output frequency is about 10% between no load and full output load across the output winding but as the load is increased beyond the rated load the frequency change becomes much greater. The overloaded oscillator becomes extremely frequency sensitive with the respect to load variations and the oscillation is cut off entirely as the load approaches a direct short circuit.

The load that may be applied to this circuit may be resistive, inductive, or capacitive within the limitations of overload as defined. An additional limitation on an inductive or capacitive load would be that when the load components reach a certain relationship to the inductive components of the transformer an LC tank circuit may be set up that may dominate the load on the transistor and take over the oscillation. This would change the mode of oscillation from square wave to sine wave and cause this circuit to react according to very well known push-pull oscillator techniques wherein the frequency of the oscillator is defined by the LC components of a tank circuit.

A capacitive load would also be limited by the peak current that can be provided by the output winding. Too high a capacity with respect to the frequency of the oscillations would amount to a short circuit.

In some instances this circuit may oscillate under different modes. For instance as the voltage of the source of potential is decreased the frequency is decreased and the wave form degenerates from a square wave to a trapezoidal wave with increasingly drooping wave tops and more and more rounding of its trailing edges until, when the voltage is only a few percent of its rated value, the oscillator breaks into higher frequency sine waves. These sine waves would presumably be at the natural frequency established by the LC constants of the circuit. As soon as the voltage is raised the oscillation breaks back into square waves.

This does not mean that square waves cannot be realized at the low voltage. If low voltage operation is desired the transformer and other circuit elements would be designed or chosen accordingly. The square waves are produced when the circuit is operating at any reasonable fraction of its optimum characteristics.

Other variations of the wave form intermediate between sine waves and rounded trailing-edge square waves may be achieved by varying other circuit constants. The starting device, as it affects the circuit constants, may dictate the mode of oscillation and otherwise influence the wave form since the starting device introduces a distortion into the circuit. With asymmetrical starting connections the distortion would be asymmetrical.

Other variations to the wave form and other modes of oscillation will be established by the transformer characteristics which are primarily influenced by the core material. This follows since the wave form is established and the operation is a result of the saturation of the transformer. The wave form consequently may resemble the saturation curve of the core material.

Other minor factors influencing the wave form include the transient response of the transformer and the resistive and inductive constants of the circuit elements.

The device described in the foregoing application is not to be confused with a single sided blocking circuit connected in push-pull according to conventional practice. This circuit will not operate as taught with only one sided connection since the single polarity of current could drive the transformer to saturation in only one direction. There is no means in a basic single sided connection for realizing the saturation in the opposite direction. This circuit will oscillate with only one side connected but the oscillation may be erratic and the wave form may be unreliable.

In a typical self-excited transistor oscillator constructed in accordance with the principles of the invention and as shown in the drawing the source of potential 40 is 45 volts and type X–78 transistors, made by the Transistor Products Incorporated, are used. The transistor primary winding 32 is about 504 turns of #30 heavy formex wire, center-tapped. The tertiary feed back winding 36 is between 20 and 100 turns of #28 heavy formex wire, center-tapped, and the secondary is about 1500 turns of #36 heavy formex wire. The core is built of EI–75 laminations of nickel-iron alloy #49 in a ¾ inch stack. It is of course to be understood that these values and components are intended by way of illustration only and should not be regarded as limiting the practice of the invention to these parameters.

The ratios of the windings may be varied to increase or decrease feed back and inductive reactance of the transformer. The secondary winding is determined by the output load impedance that will be used.

Other variations of circuit elements will be obvious to those skilled in the art and other types of transistor connections such as common emitter or common collector could as easily be employed within the teachings of this application and those of the art. The opposite polarity of voltage would be used where indicated by the transistor types or connections.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a square wave oscillator the combination comprising a pair of substantially identical transistors having emitter, base and collector electrodes, a saturable transformer including a center-tapped primary winding, a secondary winding and a center-tapped tertiary winding, a source of voltage, means connecting said source of voltage through the primary of said transformer to the base-collector electrodes of said transistors in push-pull connection, means connecting said tertiary winding between said base and emitter electrodes in a positive feedback connection and means adapted to connect an external load to the terminals of said secondary winding.

2. A transistor square wave oscillator comprising a pair of transistors having at least emitter, base and collector electrodes, a saturable core transformer having a primary winding, a secondary winding, and a tertiary winding, means adapted to connect a source of voltage through said primary winding to the base and collector electrodes of said transistors in push-pull connection, means connecting said tertiary winding to the base and emitter electrodes of said transistors in a positive feedback connection, and means adapted to connect an external load across the said secondary winding.

3. A square wave oscillator circuit according to claim 2 wherein the turns ratio of the said primary winding to the said tertiary winding is approximately 10 to 1.

References Cited in the file of this patent

UNITED STATES PATENTS

| | | |
|---|---|---|
| 2,708,241 | Bess | May 10, 1955 |
| 2,774,878 | Jensen | Dec. 18, 1956 |

UNITED STATES PATENT OFFICE

CERTIFICATE OF CORRECTION

Patent No. 2,813,976

November 19, 1957

George C. Uchrin et al.

It is hereby certified that error appears in the above numbered patent requiring correction and that the said Letters Patent should read as correcte below.

In the grant, line 2, and in the heading to the printed specification, lines 3 and 4, name of co-inventor, for "William O. Taylor" read --Wilfred O. Taylor--.

Signed and sealed this 1st day of July 1958.

(SEAL)

Attest:

KARL H. AXLINE

Attesting Officer

ROBERT C. WATSON

Commissioner of Patents